United States Patent
Mollica, Jr. et al.

[11] 3,729,805
[45] May 1, 1973

[54] METHOD OF PRODUCING STAINLESS STEEL-LOW CARBON STEEL COMPOSITES

[75] Inventors: Richard J. Mollica, Jr., Royal Oak; Joseph E. Hunter, Jr., Rochester; Kenneth R. Bladzik, Plymouth, all of Mich.

[73] Assignee: General Motors Corporation, Detroit, Mich.

[22] Filed: Nov. 8, 1971

[21] Appl. No.: 196,528

[52] U.S. Cl. ............... 29/471.7, 29/471.1, 29/475, 29/480, 29/504
[51] Int. Cl. ............................................. B23k 31/02
[58] Field of Search .................... 29/471.1, 471.7, 29/472.3, 480, 475, 482, 504

[56] References Cited

UNITED STATES PATENTS

| | | | |
|---|---|---|---|
| 2,390,452 | 12/1945 | Mudge | 29/471.1 |
| 2,490,549 | 12/1949 | Schultz et al. | 29/471.1 X |
| 2,515,191 | 7/1950 | Carpenter et al. | 29/471.1 |
| 3,393,445 | 7/1968 | Ulam | 29/472.3 X |

*Primary Examiner*—J. Spencer Overholser
*Assistant Examiner*—Richard Bernard Lazarus
*Attorney*—William S. Pettigrew et al.

[57] ABSTRACT

Stainless steel-low carbon steel composite sheets are prepared by welding a sheet of stainless steel to one side of a sheet of low carbon steel, the carbon steel sheet being preferably in the form of a tray, depositing many small pieces of low carbon steel scrap (offal) on the carbon steel sheet in a thick, porous layer of uniform thickness, heating the welded sheets and scrap particles to a temperature of about 2000° F., and passing them through at least one set of rollers to weld the low carbon steel scrap into a fully densified, solid layer including the carbon steel sheet and to weld the carbon steel layer to the adjoining stainless steel sheet. The resulting product is a flat-rolled composite sheet wherein the relatively thick low carbon steel portion is simultaneously formed from scrap particles and welded to a thinner stainless steel layer.

7 Claims, 9 Drawing Figures

Patented May 1, 1973
3,729,805

METHOD OF PRODUCING STAINLESS STEEL-LOW CARBON STEEL COMPOSITES

This invention pertains to a method of forming flat-rolled stainless steel-low carbon steel composite products. More particularly, this invention pertains to a method of utilizing low carbon steel scrap in the formation of a flat-rolled carbon steel core-stainless steel clad composite.

Low carbon steel-stainless steel composites have traditionally been formed by rolling together preformed sheets of stainless steel and carbon steel or by coating a solid core material of one with a melt of the other. Such composites have been relatively expensive because of the necessity of preparing both portions of the composite in substantially finished sheet form or the necessity of preparing a melt of one of the materials for cladding upon the other.

It is an object of the present invention to provide a method of forming flat-rolled stainless steel-low carbon steel composites in which no melting is required and in which relatively inexpensive low carbon steel scrap is employed to form a major portion of the carbon steel portion of the composite.

It is a more specific object of the present invention to provide a method of forming flat-rolled stainless steel-low carbon steel composite materials wherein a strong coextensive bond is obtained between the carbon steel and the stainless steel layers by solid state welding and wherein carbon steel scrap particles are rolled and welded together to form a major portion of the carbon steel layer.

In accordance with a preferred embodiment of our invention, these and other objects and advantages are accomplished by initially forming a tray of low carbon steel sheet material. The tray is of a suitable width for passing between the work rolls of a standard rolling mill, typically 16 to 48 inches or more. The tray will be upwards of 5 to 8 inches or more in height and of any suitable length, such as for example 10 to 30 feet. The tray is filled with pieces of clean low carbon steel scrap stacked in a porous layer of substantially uniform thickness. The scrap is stacked to a depth considerably greater than the thickness of the carbon steel tray material. The scrap may be of random size and shape, preferably no greater than 2 to 3 inches in greatest dimension. Preferably, the tray is covered by welding a top sheet of low carbon steel to the sides and ends of the tray. A sheet of stainless steel is then placed against the bottom and/or the top of the tray, and the edges of the stainless steel sheet seam-welded to the adjoining carbon steel surface.

The scrap particle-tray package is then heated in a furnace, preferably in a neutral or reducing atmosphere, to a temperature of about 1800° to 2200° F. Before removal from this protective atmosphere the package is passed between a set of rollers to weld the individual pieces of scrap to each other and to the carbon steel sheet to form a consolidated layer having a density of preferably at least 90 percent of the density of solid low carbon steel. At the same time, the carbon steel is fused coextensively to the adjoining stainless steel sheet or sheets. This composite strip may then be passed through additional rolling mill stages to fully consolidate the carbon steel and reduce the composite strip or sheet to a desired predetermined thickness. It will be appreciated that if stainless steel sheets were initially seam-welded to both the top and bottom of the original tray, the resulting product will have stainless steel cladding on both the top and bottom surfaces. If stainless steel was originally welded to only one side of the tray, then only one surface of the finished product will have a stainless steel cladding. It is intended that the major portion of the carbon steel portion of the composite be formed of carbon steel scrap.

Other objects and advantages of our invention will become more apparent from a detailed description thereof which follows. Reference will be made to the drawings, in which.

Low carbon steels are generally regarded as those steel products containing, by weight, about 0.03 to 0.12 percent carbon, 0.20 to 0.60 percent manganese, 0.04 percent maximum phosphorus, certain impurities in amounts as low as possible, and the balance iron. Very large quantities of low carbon steels in sheet form are used in manufacturing operations. As a result, large amounts of relatively clean low carbon steel scrap are produced and available at a relatively low price. A process for the reconstitution of ferrous metal scrap into flat-rolled products is described in United States patent application Ser. No. 13,368, filed Feb. 24, 1970, now U.S. Pat. No. 3,626,577. This application is assigned to the assignee of the present application. In the above application suitable techniques for cleaning and depositing scrap ferrous metal particles on a carrier sheet, heating the carrier sheet and scrap in a furnace and subsequently hot rolling the scrap and carrier sheet to a solid flat-rolled product are described. Some of that technology is applicable in the present invention and, therefore, Ser. No. 13,368 is incorporated herein by reference.

In general, it is contemplated that in accordance with the subject method relatively small pieces of randomly sized and shaped low carbon steel scrap may be used. It is preferred that scrap pieces no greater than about 3 inches in greatest dimension be employed in our process. The configuration of the available scrap will depend on the nature of the forming operation which produced it. Sometimes the scrap will be nearly flat. Other times it will be highly contorted and irregularly shaped. If the scrap is initially substantially flat, it can be fully flattened and sheared into flat chips no greater than about 3 inches, and preferably no greater than about 1½ to 2 inches, in greatest dimension. If the strip is initially highly contorted and greater than three inches in largest dimension it is usually desirable to break up the scrap into smaller pieces, such as by hammer milling. If the scrap contains oil or other forming lubricants or contaminants, they should be removed before use in the subject invention. This may be accomplished by solvent cleaning or by heating the scrap in a rotary kiln to burn off any lubricant and remove any other debris.

Figure 1:
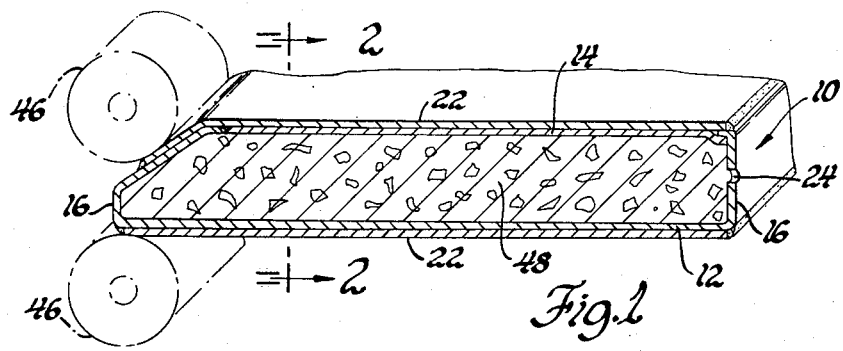
FIG. 1 is an elevational view in section of a low carbon steel tray filled with low carbon steel scrap. As shown in this figure, stainless steel sheets have been welded to the top and bottom surfaces of the carbon steel tray.

After the carbon steel scrap particles have been suitably cleaned they are deposited in a carbon steel tray. The tray is formed of pieces of carbon steel sheet and has bottom, side, end and top members as depicted particularly in FIGS. 1 and 2. FIG. 1 depicts a loaded tray 10 in longitudinal section. The tray has a low carbon steel bottom 12, top 14 and ends 16 and sides 20 (see FIGS. 2, 3 and 4). The front end of the tray is preferably tapered to facilitate introduction between the working rolls (indicated only in phantom at 46 in FIG. 1) of a rolling mill. The tray may be formed in any convenient manner and to any suitable dimensions. In general it is preferred that the tray be about 5 to 8 inches in height, 16 to 48 inches in width and 10 to 30 feet in length.

The tray 10 is then filled with low carbon steel scrap particles 48 in a porous mass. At this stage the tray may be vibrated to better pack together the scrap particles 48. Depending upon the relative sizes and shapes of the particles, the porous tray filling may have a density of about 20 to 50 percent of the density of solid low carbon steel. After the tray has been loaded with scrap particles a carbon steel sheet top 14 is laid on the tray and welded to the side 20 and end 16 members.

Figure 2:
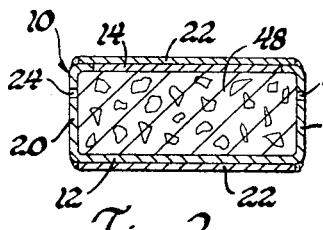
FIG. 2 is another sectional view of the packed tray along lines 2—2 of FIG. 1.

A sheet of stainless steel of suitable thickness is then laid against one or more surfaces of the tray, and the edges of the stainless steel sheet seam-welded to the adjoining carbon steel sheet. As shown in FIGS. 1 and 2, stainless steel sheets 22 have been seam-welded (actual welds not shown) to the bottom 12 and top 14 of the carbon steel tray 10. Thus, a tray or package is formed which is a composite of carbon steel with a layer of stainless steel on at least one of its outer surfaces. The contents of the tray in this embodiment of the invention is a porous mass of low carbon steel scrap particles.

The tray package is then heated in a furnace to a suitable elevated solid state welding temperature at which the low carbon steel scrap particles may be fused to each other and to the surfaces of the tray without melting. Such temperatures typically are in the range of about 1800° to 2200° F. It is possible to carry out our process by heating the tray package in the presence of the combustion products of a gas fired furnace. However, it is preferred that the tray package be heated in a neutral or slightly reducing atmosphere so that excessive oxidation of the ferrous metal does not take place. Preferably holes 24 are drilled in the tray 10 so that the furnace atmosphere may permeate the porous mass 48 during heating and escape therefrom during the subsequent rolling. An example of a suitable atmosphere is one which consists nominally of 40 percent by volume hydrogen, 20 percent by volume carbon monoxide and 40 percent by volume nitrogen. Preferably the dew point of the gas is below 40° F. An example of another suitable atmosphere is one which contains 2 to 40 percent by volume hydrogen and the remainder nitrogen.

After the scrap-filled tray has been entirely heated to about 2000° F. it is consolidated by being passed through a suitable rolling mill before removal from the nonoxidizing atmosphere. The rollers 46 are indicated schematically in phantom in FIG. 1 to depict the intended operation. They are not necessarily drawn to scale with respect to the size of the package itself. The furnace is not shown. During this pass through the rolling mill the hot scrap particles are subjected to extensive mechanical work and are thereby consolidated and welded to each other and to the adjoining carbon steel surfaces of the original tray. At the same time the carbon steel tray material is coextensively bonded to the adjoining sheet of stainless steel. Initially it was only seam-welded thereto. It is expected that the original mass of porous scrap particles will be consolidated to at least about 90 percent of the density of solid low carbon steel.

The hot-rolled composite strip is then passed through one or more additional roller mills to complete the consolidation of the scrap particles into a fully densified layer and to complete, if necessary, the welding of carbon steel to the stainless steel layer. At the same time the composite flat-rolled product is reduced to a predetermined thickness. No special atmospheres are required after the first rolling stage.

Figure 2A:
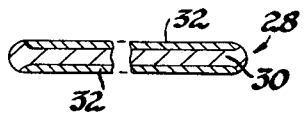
FIG. 2a is a sectional view of the composite product produced by hot rolling the scrap-filled tray of FIG. 2.
Figure 3A:
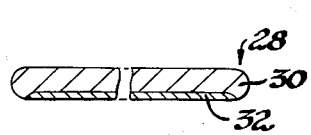
FIG. 3a is a sectional view of the composite product produced by hot rolling the scrap-filled tray depicted in FIG. 3.
Figure 4A:
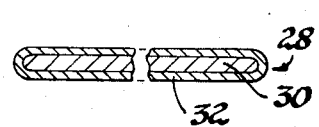
FIG. 4a is a sectional view of the flat-rolled composite product produced by hot rolling the tray of FIG. 4.

If a carbon steel carrier tray is employed, as shown in FIG. 2 with stainless steel sheets welded to both the top and bottom surfaces thereof, the final flat-rolled composite product will appear in section as depicted in FIG. 2a. The flat-rolled composite 28 in section will have a relatively thick carbon steel core 30 with stainless steel cladding 32 on both the top and bottom surfaces thereof.

Figure 3:
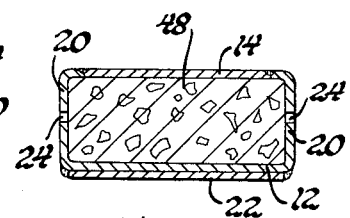
FIG. 3 is a section of a tray like that depicted in FIG. 2 except that a stainless steel sheet has been seam-welded only to the bottom surface of the carbon steel tray.

FIG. 3 depicts a different embodiment of our invention in that the carbon steel tray initially has a stainless steel layer seam-welded to only one surface thereof. Therefore, after hot rolling to a fully consolidated flat product, the composite 28 will consist of a carbon steel core 30 with the stainless steel cladding 32 on only one side. It will be appreciated that in this embodiment a carbon steel top is not required on the tray.

Figure 4:
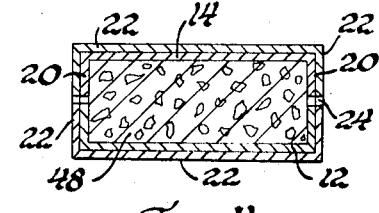
FIG. 4 is a section of a tray like that depicted in FIG. 2 except that stainless steel sheet has been welded to all sides of the carbon steel tray.

FIG. 4 depicts still a different embodiment of the invention in which stainless steel sheet was applied completely around the periphery of the carbon steel tray. Consequently, upon full consolidation, the flat-rolled composite product 28 consists of a low carbon steel core 30 completely enclosed in a stainless steel cladding 32.

Figure 5:
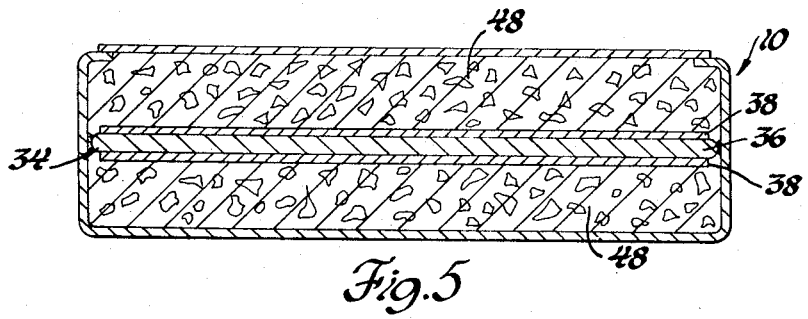
FIG. 5 is a sectional view of a tray like that of FIG. 2 depicting still a different embodiment of the invention wherein a carbon steel sheet-stainless steel sheet-carbon steel sheet sandwich is placed in the middle of the scrap-filled tray.
Figure 5A:
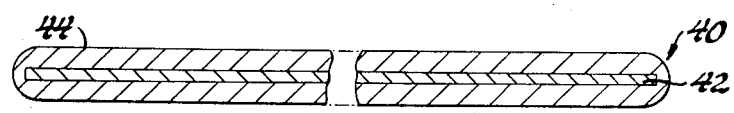
FIG. 5a is a sectional view of the product produced by hot rolling the tray depicted in FIG. 5.

In FIG. 5 is depicted still a different embodiment of the invention. In this instance no stainless steel is welded to the outside of the carbon steel tray. However, a sandwich type composite 34 consisting of a stainless steel sheet core 36, with sheets of low carbon steel cladding 38 seam-welded to each of the major surfaces, is placed within the scrap-filled tray 10. This is accomplished by filling the tray approximately half full with carbon scrap steel particles 48, placing the stainless steel-carbon steel composite 34 in the tray on the scrap 48 and, if desired, welding the composite 34 to the inner surfaces of the sides of the carbon steel tray. The tray is then completely filled with carbon steel scrap 48. When this tray-scrap package has been hot rolled and fully consolidated to a flat-rolled product it resembles the composite material 40 depicted in FIG. 5a which consists of a stainless steel core 42 enclosed in carbon steel cladding 44. A composite material of this type is useful in applications where it is desired to provide a barrier to corrosion within the material itself. In other words, it is contemplated that a surface of the carbon steel cladding might be corroded down to the stainless steel core, but that the stainless steel core would prevent further penetration of the corrosion for an extended period of time.

In general, we have found that best results are obtained in accordance with our process when the stainless steel sheet which is initially welded to a low carbon steel sheet is at least one-eighth of an inch thick and preferably three-sixteenths of an inch or greater in thickness. Usually it is desirable to have the adjoining carbon steel sheet of about the same thickness as the stainless steel. The stainless steel may be welded or otherwise applied to a carbon steel sheet either before or after the carbon steel is formed into a tray. It is preferred that the stainless steel sheet be placed flat against the adjoining low carbon steel sheet and seam-welded thereto completely around the periphery of the stainless steel to prevent ingress of hot gases during subsequent operations.

It is intended that a major portion of the carbon steel making up the final composite product be initially provided in the form of carbon steel scrap. As indicated above, preferably the original tray is 5 to 8 inches in height so that substantial quantities of scrap may be placed in the tray in a porous layer. As indicated above, it is preferred to seam-weld the stainless steel sheet to an adjoining carbon steel sheet in order to obtain a satisfactory bond therebetween in accordance with our process without using an extremely dry reducing atmosphere. By welding the stainless steel to an adjoining carbon steel sheet and rolling additional carbon steel scrap to the carbon steel sheet, a composite stainless steel-carbon steel material is readily obtained using standard rolling mill equipment and relatively inexpensive and easily maintainable, nonoxidizing furnace atmospheres.

It is contemplated that any conventional stainless steel may be employed in the practice of our invention to make the intended composite materials. By stainless steels we mean those ferrous base materials containing by weight at least about 10 percent chromium and preferably more than about 18 percent chromium together with lesser quantities of nickel. Examples of suitable stainless steels are those whose composition limits and ranges are found on page 1112 of *The Making, Shaping and Treating of Steel*, Eighth Edition, published by the United States Steel Corporation.

While our invention has been described in terms of a few specific embodiments thereof, it will be appreciated that other forms could readily be adapted by one skilled in the art. Accordingly, the scope of the invention is intended to be limited only by the following claims.

What is claimed is:

1. A method of preparing flat-rolled stainless steel-low carbon steel composite material comprising placing a sheet of low carbon steel against a sheet of stainless steel with a major surface of one sheet adjoining a major surface of the other, welding said sheets together at the edges of said stainless steel sheet to form a composite sheet, placing small pieces of low carbon steel scrap adjacent the carbon steel side of said composite sheet in a porous layer of substantially uniform thickness, heating the scrap pieces and composite sheet to a suitable low carbon steel, solid state fusion temperature, passing said heated scrap particles and composite sheet between a set of rollers to compact and weld said scrap pieces to each other and to said carbon steel sheet and to weld said carbon steel sheet to said stainless steel sheet thereby forming a consolidated flat-rolled product having a stainless steel layer and a carbon steel layer, the carbon steel layer having a density of at least 90 percent of the density of carbon steel, and passing said flat-rolled composite product through at least one additional roller stage to consolidate said carbon steel layer into a fully densified solid layer.

2. A method of preparing a flat-rolled stainless steel-low carbon steel composite product comprising placing a sheet of stainless steel flat against a sheet of carbon steel which is at least as large as said stainless steel sheet, seam-welding said sheets together at the periphery of said stainless steel sheet to form a composite sheet, stacking small pieces of low carbon steel scrap adjacent the carbon steel side of said composite sheet in a porous layer which is substantially thicker than said low carbon steel sheet, heating the scrap pieces and composite sheet to a temperature in the range of about 1800° to 2200° F., passing said heated scrap particles and composite sheet between a set of rollers to compact and weld said scrap particles to each other and to said carbon steel sheet and to coextensively weld said carbon steel sheet to said stainless steel sheet thereby forming a consolidated flat-rolled product having a stainless steel layer and a carbon steel layer, the major portion of said carbon steel layer being formed by the compaction of said scrap particles, said carbon steel layer having a density of at least 90 percent of the density of carbon steel, and passing said flat-rolled composite product through at least one additional roller stage to consolidate said carbon steel layer into a fully densified solid layer.

3. A method of preparing a flat-rolled stainless steel clad-low carbon steel core composite material comprising forming a long tray of low carbon steel sheet material, said tray having side members, end members and a flat bottom, depositing many small pieces of low carbon steel scrap in said tray to fill it with a uniformly thick, porous mass of said scrap pieces, closing said tray with a low carbon steel sheet top member, welding a sheet of stainless steel to at least one surface of said carbon steel tray either before or after said tray is filled with said scrap pieces, heating the scrap-filled tray to a low carbon steel, solid state fusion temperature, passing the heated tray and its contents between a set of rollers to compact and weld said scrap pieces to each other and to said carbon steel sheet and to coextensively weld said stainless steel sheet to the adjoining carbon steel surface thereby forming a consolidated flat-rolled product having a stainless steel portion and a carbon steel portion, the carbon steel portion having a density of at least 90% of the density of carbon steel, and passing said flat-rolled composite product through at least one additional roller stage to consolidate said carbon steel portion into a fully densified solid layer.

4. A method of reconstituting low carbon steel scrap into a reusable flat-rolled low carbon steel-stainless steel composite product comprising processing said scrap into the form of many small pieces, depositing said pieces on a low carbon steel carrier, said pieces being stacked in a porous layer on said carrier to a height substantially several times in excess of the thickness thereof, welding a sheet of stainless steel at its edges to the bottom surface of said carrier, heating said pieces and carrier to a suitable low carbon steel, solid state welding temperature, passing said heated pieces and carrier between a set of rollers to compact and weld said scrap pieces to each other and to said carbon steel carrier and to weld said carbon steel carrier to said stainless steel sheet thereby forming a consolidated flat-rolled product having a stainless steel layer and a carbon steel layer, the carbon steel layer having a density of at least 90 percent of the density of carbon steel, and passing said flat-rolled composite product through at least one additional roller stage to consolidate said carbon steel layer into a fully densified solid layer.

5. A method of preparing a flat-rolled stainless steel clad-low carbon steel core composite material comprising forming a long tray of low carbon steel sheet material, said tray having side members, end members and a flat bottom, depositing many small pieces of low carbon steel scrap in said tray to fill it with a uniformly thick, porous mass of said scrap pieces, welding a sheet of stainless steel to a surface of said carbon steel tray either before or after said tray is filled with said scrap pieces, heating the scrap-filled tray to a low carbon steel solid state fusion temperature, passing the heated tray and its contents between a set of rollers to compact and weld said scrap pieces to each other and to said carbon steel sheet and to coextensively weld said stainless steel sheet to its adjoining carbon steel surface thereby forming a consolidated flat-rolled product having a stainless steel portion and a carbon steel portion, the carbon steel portion having a density of at least 90 percent of the density of carbon steel, and passing said flat-rolled composite product through at least one additional roller stage to consolidate said carbon steel portion into a fully densified solid layer.

6. A method of preparing a flat-rolled stainless steel clad-low carbon steel core composite material comprising forming a long tray of low carbon steel sheet material, said tray comprising side members, end members and a flat bottom, stacking many small pieces of low carbon steel scrap in said tray to fill it in a porous layer several times greater in thickness than said low carbon steel sheet material, welding a sheet of stainless steel to at least one surface of said carbon steel tray either before or after said tray is filled with said scrap pieces, heating the scrap-filled tray to a temperature in the range of 1800° to 2200° F. in a nonoxidizing atmosphere, passing the heated tray and its contents before removal from said atmosphere between a set of rollers to weld said scrap pieces to each other and to said carbon steel sheet and to coextensively weld said stainless steel sheet to its adjoining carbon steel surface thereby forming a consolidated flat-rolled product having a stainless steel portion and a carbon steel portion, the carbon steel portion having a density of at least 90 percent of the density of carbon steel, and passing said flat-rolled composite product through at least one additional roller stage to consolidate said carbon steel portion into a fully densified and solid layer.

7. A method of preparing a flat-rolled low carbon steel clad-stainless steel core composite material comprising forming an elongated tray of low carbon steel sheet material, said tray having side members, end members and a flat bottom, stacking many small pieces of low carbon steel scrap in said tray in a porous layer approximately one-half the height of said tray, placing a three-layer composite sheet in said tray on said scrap particles, said composite sheet consisting of an inner layer of stainless steel and two outer layers of low carbon steel, stacking additional scrap pieces of low carbon steel in said tray to fill it, heating the scrap-filled tray to a temperature in the range of 1800° to 2200° F. in a nonoxidizing atmosphere, passing the heated tray and its contents before removal from said atmosphere between a set of rollers to weld said scrap pieces to each other and to adjoining carbon steel sheet surfaces and to coextensively weld said carbon steel to said stainless steel sheet thereby forming a consolidated flat-rolled product having an inner stainless steel portion and outer carbon steel portions, said carbon steel portions having a density of at least 90 percent of the density of carbon steel, and passing said flat-rolled composite product through at least one additional roller stage to consolidate said carbon steel portion into a fully densified solid layer.

* * * * *